United States Patent
Stretton

(10) Patent No.: US 7,255,528 B2
(45) Date of Patent: Aug. 14, 2007

(54) LINER FOR A GAS TURBINE ENGINE CASING

(75) Inventor: Richard G Stretton, Loughborough (GB)

(73) Assignee: Rolls-Royce plc, London (GB)

( * ) Notice: Subject to any disclaimer, the term of this patent is extended or adjusted under 35 U.S.C. 154(b) by 323 days.

(21) Appl. No.: 10/967,480

(22) Filed: Oct. 19, 2004

(65) Prior Publication Data

US 2005/0089391 A1     Apr. 28, 2005

(30) Foreign Application Priority Data

Oct. 22, 2003   (GB) ................... 0324544.6

(51) Int. Cl.
*F01B 25/16* (2006.01)

(52) U.S. Cl. ................ 415/9; 415/119; 415/196

(58) Field of Classification Search .............. 415/9, 415/119, 173.3, 173.4, 196, 197, 200, 214.1; 181/210, 214, 292; 428/116–118; 52/489.1, 52/506.05
See application file for complete search history.

(56) References Cited

U.S. PATENT DOCUMENTS

| | | | |
|---|---|---|---|
| 3,542,152 A | * | 11/1970 | Oxx et al. ............... 181/214 |
| 3,748,213 A | * | 7/1973 | Kitching et al. ........... 181/292 |
| 4,925,365 A | | 5/1990 | Crozet et al. |
| 5,188,507 A | * | 2/1993 | Sweeney ................. 415/173.1 |
| 6,371,721 B1 | * | 4/2002 | Sathianathan et al. ......... 415/9 |
| 6,468,026 B1 | | 10/2002 | Bonnoitt et al. |

FOREIGN PATENT DOCUMENTS

| | | | |
|---|---|---|---|
| FR | 2823590 A | | 10/2002 |
| GB | 2319589 A | * | 5/1998 |

* cited by examiner

*Primary Examiner*—Edward K. Look
*Assistant Examiner*—Dwayne J White
(74) *Attorney, Agent, or Firm*—W. Warren Taltavull; Manelli Denison & Selter PLLC

(57) ABSTRACT

A turbofan gas turbine engine (10) comprises a fan rotor (32) carrying a plurality of radially extending fan blades (34). A fan blade containment assembly (38) surrounds the fan blades (34) and the fan blade containment assembly (38) comprises a generally cylindrical, or frustoconical, metal casing (40). The casing (40) comprises an annular member (54) positioned axially upstream of the tip (37) of the fan blade (34). The annular member (54) extends in a radially inwardly and axially downstream direction from the metal casing (40) towards the tip (37) of the fan blade (34). A set of acoustic panels (72C) is also provided. A set of acoustic panels (72B) is secured to the metal casing (40) by resilient fingers (80, 84) on the upstream and downstream ends (82,86) of the acoustic panels (72B) which locate on the annular member (54) and the acoustic panels (72C).

25 Claims, 3 Drawing Sheets

LINER FOR A GAS TURBINE ENGINE CASING

FIELD OF THE INVENTION

The present invention relates to gas turbine engine casings, particularly for gas turbine engine fan casings and turbine casings, particularly to an improved liner for use within the gas turbine engine casing, more particularly to an improved acoustic liner for use within the gas turbine engine casing.

BACKGROUND OF THE INVENTION

Turbofan gas turbine engines for powering aircraft conventionally comprise a core engine, which drives a fan. The fan comprises a number of radially extending fan blades mounted on a fan rotor enclosed by a generally cylindrical fan casing. The core engine comprises one or more turbines, each one of which comprises a number of radially extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above-mentioned containment casings. In the event that a blade becomes detached it passes through the casing and is contained by the fibrous material.

SUMMARY OF THE INVENTION

There is a requirement to provide an acoustic liner within the fan casing axially between the tips of the fan blades and the hook.

Conventionally the acoustic liner is secured within the fan casing by fasteners, nuts and bolts or screws, or by adhesive bonding.

However, the use of fasteners to secure the acoustic liner to the fan casing at a position between the tips of the fan blades and the hook would weaken the fan casing and interfere with the ability of the fan casing to contain a detached fan blade. The fasteners extend radially through reinforced regions of the acoustic liner and these reinforced regions reduce the acoustic liner face area, which reduces the effectiveness to absorb noise, or attenuate sound, and the fasteners produce steps and gaps which affect the aerodynamic flow over the acoustic liner. In one known arrangement the acoustic liner comprises reinforced regions which include a number of honeycomb cells filled with a strong material and an aperture is machined through the reinforced region for a fastener to pass through. Alternatively the acoustic liner comprises a reinforced region, which includes a boss provided in a honeycomb cell and the boss has an aperture for a fastener to pass through as disclosed in our published UK patent application GB2319589A.

The use of adhesive bonding may be used to secure the acoustic liner to the fan casing, but subsequent replacement would be difficult and any damage to the acoustic liner would require repair using filler and this would also interfere with the ability of fan casing to contain a detached fan blade.

Ideally the acoustic liner would be easy to install and remove or replace.

Accordingly the present invention seeks to provide a novel acoustic liner for a gas turbine engine casing which overcomes the above mentioned problems.

Accordingly the present invention provides a gas turbine engine casing comprising a generally cylindrical, or frustoconical, casing, the casing including at least one member, the member having a first portion extending radially from the casing and a second portion extending axially from the first portion of the member, at least one liner panel being positioned radially from the casing, a first end of the liner panel being removably securable on the member by at least one resilient finger, the at least one resilient finger being biased to move axially away from the first end of the liner panel to locate on the second portion of the member.

A second end of the acoustic liner panel being removably securable on a further member by at least one resilient finger, the at least one resilient finger being biased to move axially away from the second end of the liner panel to locate on the further member.

The member may be an annular member. The member may be a liner panel.

The further member may have a first portion extending radially from the casing and a second portion extending axially from the first portion of the further member.

The further member may be an annular member. The further member may be a liner panel.

The resilient finger may extend the full length of the first end of the liner panel. There may be a plurality of resilient fingers spaced apart on the first end of the liner panel.

The resilient finger may extend the full length of the second end of the liner panel. There may be a plurality of resilient fingers spaced apart on the second end of the liner panel.

Preferably there are a plurality of liner panels arranged circumferentially within or around the casing, a first end of each liner panel being removably securable on an annular member by at least one resilient finger, the at least one resilient finger of each liner panel being biased to move axially away from the first end of the liner panel to locate on the second portion of the annular member.

Preferably the resilient finger comprises a metal.

Preferably the casing is arranged in operation coaxially around a rotor carrying a plurality of rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade.

Preferably the member is positioned axially upstream of the tip of the rotor blade, the member extending in a radially inwardly and axially downstream direction from the metal casing towards the tips of the rotor blades, the containment portion being downstream of the member, the containment portion of the casing having a greater diameter than the diameter of the casing at the member.

Preferably the member is substantially in the plane containing the most upstream point of the leading edge of the rotor blades.

Preferably the casing is a fan casing and the rotor blades are fan blades.

Alternatively the casing is a turbine casing and the rotor blades are turbine blades.

Preferably the casing is formed from a metal, for example titanium, an alloy of titanium, aluminium, an alloy of aluminium or steel.

Preferably the liner panel is an acoustic liner panel.

The present invention also provides an acoustic liner panel comprising a perforate skin and a structure to form an acoustic treatment structure, a first end of the acoustic liner panel being removably securable on a member by at least one resilient finger, the at least one resilient finger being biased to move away from the first end of the acoustic liner panel to locate on the member.

Preferably a second end of the acoustic liner panel being removably securable on a further member by at least one resilient finger, the at least one resilient finger being biased to move away from the second end of the acoustic liner panel to locate on the further member.

BRIEF DESCRIPTION OF THE DRAWINGS

The present invention will be more fully described by way of example with reference to the accompanying drawings in which.

DETAILED DESCRIPTION OF THE INVENTION

Figure 1:
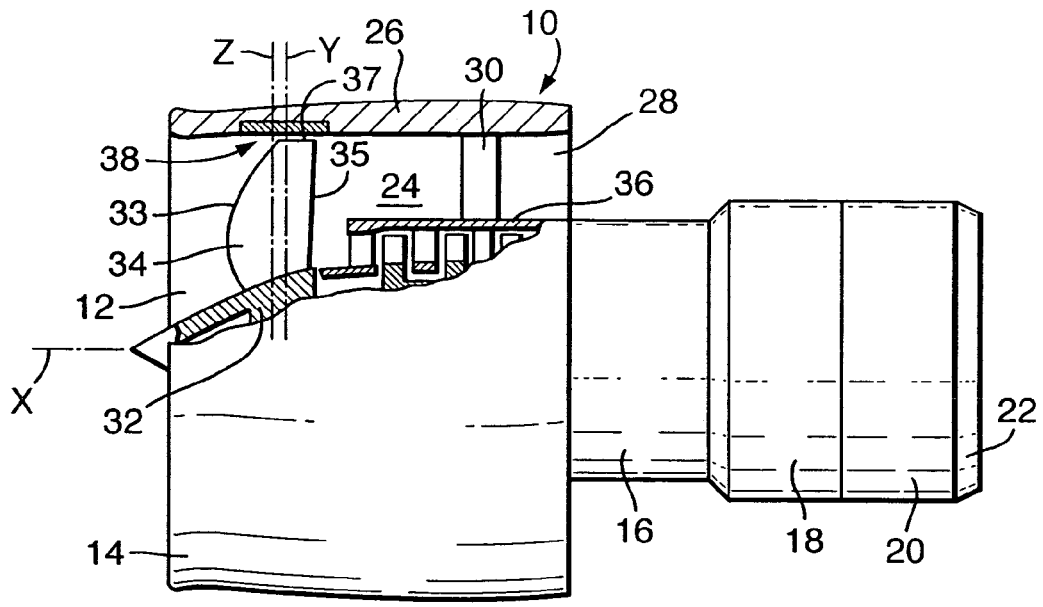
FIG. 1 is a partially cut away view of a gas turbine engine having a fan casing according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane Y of the fan blades 34. The fan blades 34 have a leading edge 33, a trailing edge 35 and a tip 37.

Figure 2:
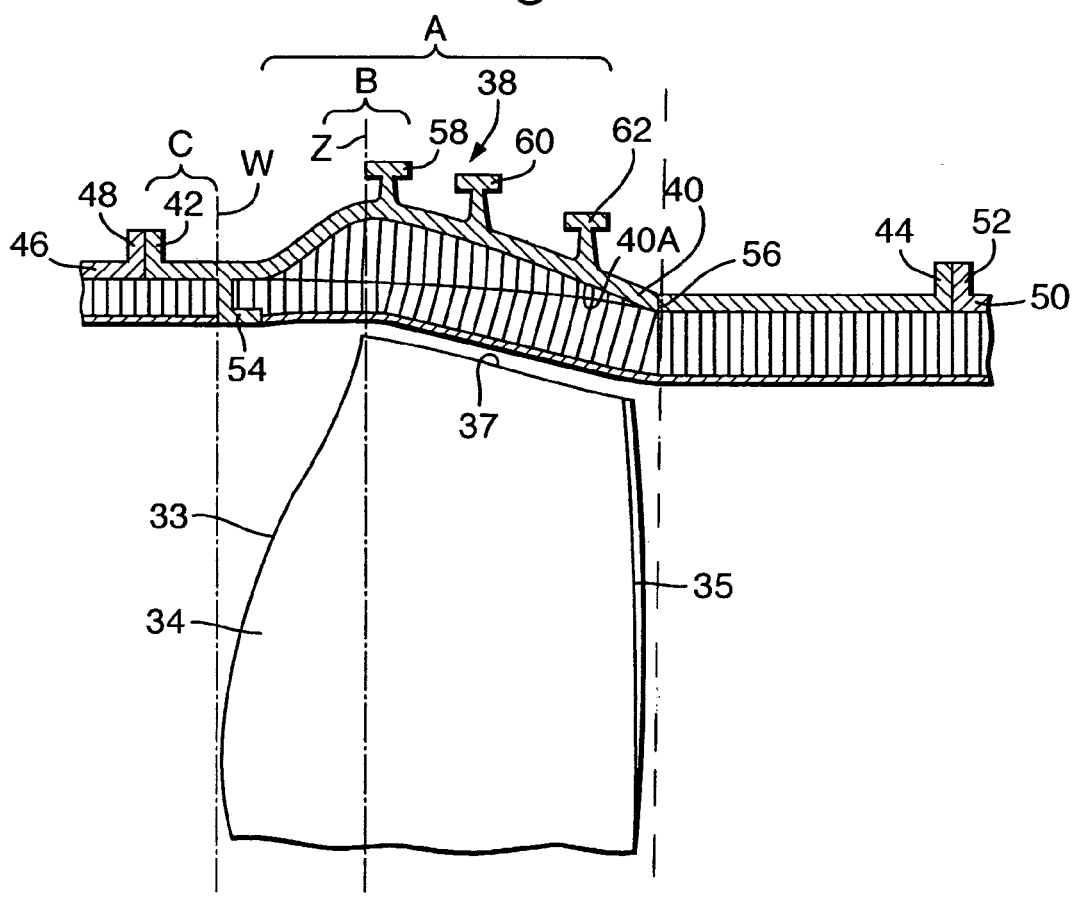
FIG. 2 is an enlarged view of the fan casing shown in FIG. 1.
Figure 3:
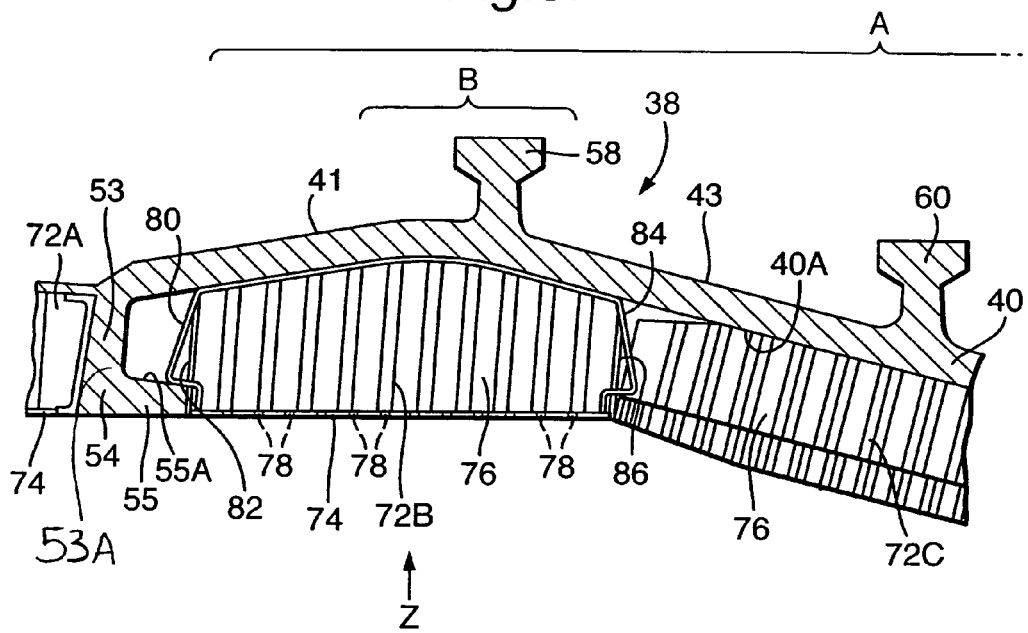
FIG. 3 is a further enlarged view of the fan casing shown in FIG. 2.
Figure 4:
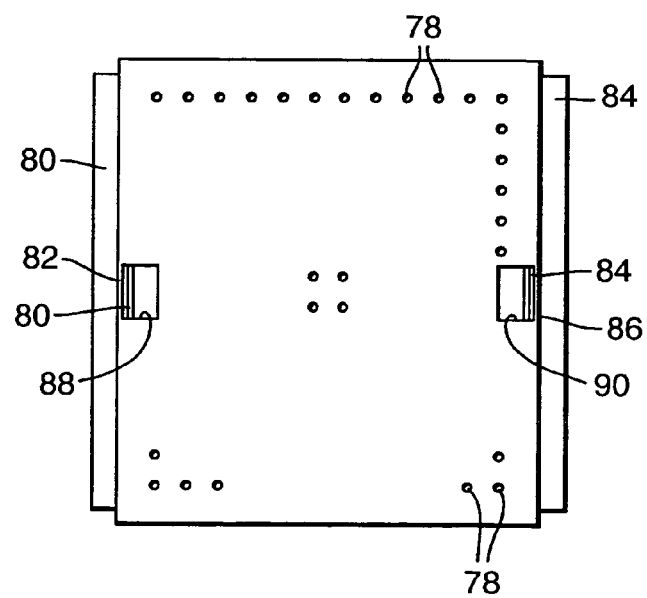
FIG. 4 is a view in the direction of arrow Z in FIG. 3.

The fan casing 26 and fan blade containment assembly 38 is shown more clearly in FIGS. 2, 3 and 4. The fan blades 34 are forwardly swept fan blades. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 comprises a downstream flange 44 by which the fan blade containment assembly 38 is connected to a flange 52 on a rear portion 50 of the fan casing 26. The metal casing 40 comprises an annular L-shaped member, or hook, 54 positioned axially upstream of the leading edge 33 of the tip 37 of the fan blade 34. The annular member 54 comprises a first portion 53 which extends in a radially inwardly direction from the metal casing 40 and a second portion 55 which extends in an axially downstream direction from the radially inner end 53A of the first portion 53 of the annular member 54 towards the tip 37 of the fan blade 34. The annular member 54 is substantially in a plane W, perpendicular to the axis X of the gas turbine engine 10, containing the most upstream point of the leading edge 33 of the fan blades 34.

The metal casing 40 has a containment portion A downstream of the annular member 54 and upstream of a plane 56, perpendicular to the axis X of the gas turbine engine 10, passing through the metal casing 40 and containing, or downstream of, the trailing edge 35 of the fan blades 34. The metal casing 40 has an upstream portion C which is upstream of the plane W. The containment portion A has a greater diameter than the diameter of the metal casing 40 at the annular member 54 and the upstream portion C of the metal casing 40. The containment portion A has a zone B substantially in a plane Z, perpendicular to the axis X of the gas turbine engine 10, containing the leading edge 33 of the tip 37 of the fan blade 34. The containment portion A of the metal casing 40 reaches a maximum diameter in the zone B. The containment portion A comprises one or more curved lines in axial cross-section, one or more straight lines in axial cross-section or at least one curved line and at least one straight line in axial cross-section to interconnect the annular member 54 and the plane 56 of the metal casing 40 to form a substantially radially outwardly dished shaped in the metal casing 40. The containment portion A progressively increases in diameter from the annular member 54 and the plane 56 to the maximum diameter in zone B.

The containment portion A of the metal casing 40 is thicker than the remainder of the metal casing 40. The containment portion A comprises a plurality of circumferentially extending ribs 58, 60 and 62. The ribs 58, 60 and 62 are T-shaped in axial cross-section. The rib 58 is arranged substantially in, or adjacent, the plane Z containing the leading edge 33 of the tip 37 of the fan blade 34. The rib 60 is arranged substantially in a plane containing the mid-chord of the fan blade 34 and the rib 62 is arranged substantially in a plane upstream of the trailing edge 35 of the fan blade 34.

It may be desirable in some circumstances to provide a number of continuous layers of a strong fibrous material wound around the thin corrugated metal casing 40 to further increase the energy absorbing capability of the fan blade containment assembly 38. The strong fibrous material may for example be woven aromatic polyamide fibers known as KEVLAR (KEVLAR is a registered trademark of Dupont Ltd). There may also be a number of layers of discrete pieces of flexible material woven from KEVLAR between the metal casing 40 and the continuous layers of fibrous material.

An acoustic liner is provided radially within the metal casing 40 to reduce noise. The acoustic liner generally comprises a plurality of acoustic panels 72A, 72B, 72C which are arranged circumferentially and axially along the inner surface 40A of the metal casing 40. Each acoustic panel 72A, 72B, 72C comprises a perforated skin 74 and a structure 76 to form an acoustic treatment structure. The perforated skin 74 has a plurality of perforations 78. The perforated skin 74 defines the flow path through the fan duct 24.

The perforated skin 78 of each acoustic panel 72A, 72B, 72C comprises aluminium, titanium or composite material, for example fiber reinforced plastic e.g. glass fiber reinforced nylon 66. The structure 76 comprises a honeycomb structure, for example an aluminium honeycomb, a titanium honeycomb, a composite material honeycomb, a resin impregnated paper honeycomb or other suitable honeycomb. The composite material honeycomb may comprise fiber reinforced plastic e.g. glass fiber reinforced nylon.

The acoustic panels 72 are secured to the metal casing 40 by various means. A circumferentially arranged set of acoustic panels 72A is arranged upstream of the plane W and the annular member 54 within the casing portion C and the acoustic panels 72A are secured to the metal casing 40 by radially extending fasteners or by adhesive bonding. A circumferentially arranged set of acoustic panels 72B is arranged axially between the tips 37 of the fan blades 34 and the annular member 54 within the metal casing 40. A further circumferentially arranged set of acoustic panels 72C is arranged around the tips 37 of the fan blades 34 and the acoustic panels 72C are secured to the metal casing 40 by radially extending fasteners or by an adhesive. The acoustic panels 72C may be provided with an abatable material on their radially inner surface and thus the acoustic panels 72C are fan blade liner panels.

The acoustic panels 72B are secured to the metal casing 40 by at least one resilient, spring, Z-shaped finger 80 on the axially upstream end 82 of each acoustic panel 72B and at least one resilient, spring, Z-shaped finger 84 on the axially downstream end 86 of each acoustic panel 72B. The resilient, spring, Z-shaped fingers 80 and 84 are biased to move axially away from the ends 82 and 84 of the respective acoustic panel 72B. The resilient, spring, Z-shaped fingers 80 are thus biased to move in an axially upstream direction radially outward of the axially extending second portion 55 of the annular member 54 and thus to secure the upstream ends 82 of the acoustic panels 72B. The resilient, spring, Z-shaped fingers 84 are thus biased to move in an axially downstream direction and radially outward of a portion of the acoustic panels 72C and thus to secure the downstream ends 86 of the acoustic panels 72B. The acoustic panels 72B are inserted, or removed, by pushing the radially inner ends of the resilient, spring, Z-shaped fingers 80 and 84 axially towards the axial center of the acoustic panels 72B. The acoustic panels 72C are provided with apertures 88 and 90 in order to allow the resilient, spring, Z-shaped fingers 80 and 84 to be pushed towards the axial center of the acoustic panels 72B. The acoustic panels 72B are inserted by moving them radially outwardly and positioning them axially between the annular member 54 and the acoustic panels 72C and releasing the resilient, spring, Z-shaped fingers 80 and 84 to allow them to move axially and radially outwardly of the second portion 55 of the annular member 54 and acoustic panels 72C. The radially outward movement of the acoustic panels 72B between the second portion 55 of the annular member 54 and the set of acoustic panels 72C preferably pushes the resilient, spring, fingers 80 and 84 towards the center of the acoustic panels 72B. The acoustic panels 72B are removed by moving them radially inwardly.

The radially outer surface 55A of the second portion 55 of the annular member 54 increases in diameter in an axial direction towards the first portion 53 of the annular member 54. This assists in moving an acoustic liner panel 72B radially outwardly to abut the inner surface 40A of the metal casing 40 due to the interaction between the resilient, spring, Z-shaped fingers 80 and the radially outer surface 55A of the second portion 55 of the annular member 54.

Preferably the resilient, spring, Z-shaped fingers 80 and 84 comprise a suitable metal or other suitable material. Other suitable shapes of resilient, spring, fingers may be used.

Figure 6:
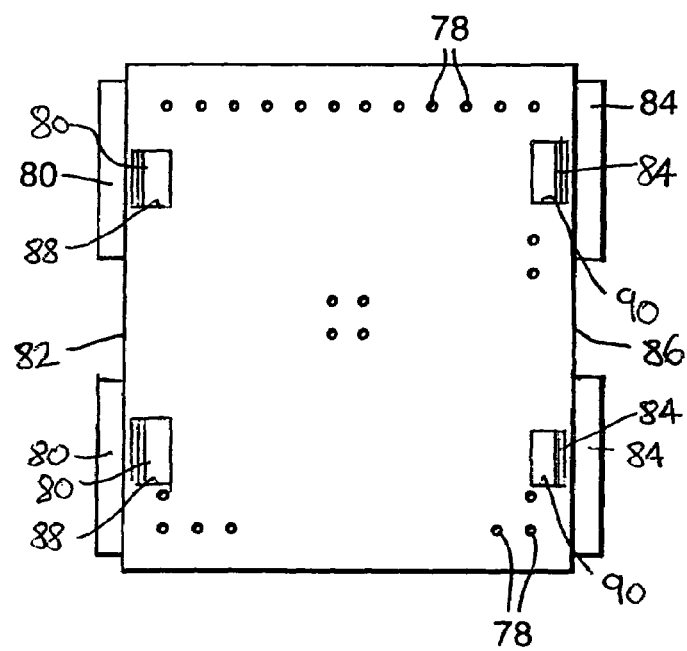
FIG. 6 is a view in the direction of arrow Z in FIG. 3 showing another embodiment according to the present invention.

Each acoustic panel 72B may have a single resilient, spring, Z-shaped finger 80 and a single resilient, spring, Z-shaped finger 84 each of which extends through a substantial portion, or the full length, of the upstream end 82 and downstream end 86 of each acoustic panel 72B respectively. Alternatively, as illustrated in FIG. 6, each acoustic panel 72B may have a plurality of resilient, spring, Z-shaped fingers 80 and a plurality of resilient, spring, Z-shaped fingers 84 which are spaced apart along the length of the upstream end 82 and downstream end 86 of each acoustic panel 72B respectively.

The advantage of the present invention is that it allows the acoustic liners to be easily installed, inserted, and removed from the casing. Additionally, fasteners are not required to secure the acoustic liners to the casing and thus there is an increased acoustic liner face area, which increases the effectiveness to absorb noise, or attenuate sound, and there are no steps and gaps to affect the aerodynamic flow over the acoustic liner.

The metal casing may be manufactured from titanium, titanium alloy, aluminium, aluminium alloy, nickel, nickel alloy and steel.

The present invention has been described with reference to a fan casing, however it is equally applicable to a compressor casing and a turbine casing.

Figure 5:
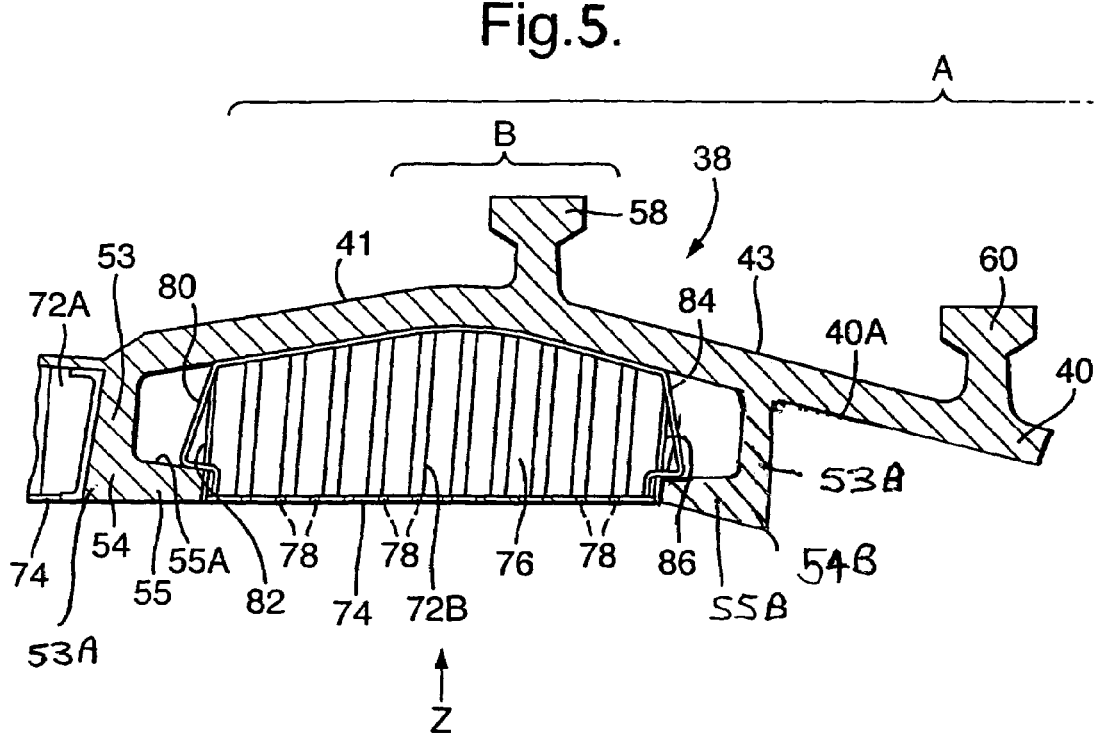
FIG. 5 is a further enlarged view of the fan casing shown in FIG. 2 showing another embodiment according to the present invention.

Although the present invention has been described with reference to the use of an annular member with an axially extending portion to retain the upstream end of the set of acoustic liners with resilient, spring, Z-shaped fingers, it may be possible, as illustrated in FIG. 5, to arrange for a further annular member 54B, which extends in a radially inward direction from the metal casing 40, having an axially extending member 55B to retain the downstream end of the set of acoustic liners with resilient, spring, Z-shaped fingers 86, or to have two annular members with axially extending portions to retain the upstream and downstream ends of the set of acoustic liners with resilient, spring, Z-shaped fingers.

Although the present invention has been described with reference to the use of an annular member with an axially extending portion to retain the upstream end of the set of acoustic liners with resilient, spring, Z-shaped fingers it may be possible to arrange for an annular member with an axially extending member to retain the downstream end of the set of acoustic liners with resilient, spring, z-shaped fingers or to have two annular members with axially extending portions to retain the upstream and downstream ends of the set of acoustic liners with resilient, spring, Z-shaped fingers.

The present invention has described the annular member as being L-shaped in cross-section, but the annular member may be T-shaped in cross-section in order to support acoustic liner panels axially upstream and axially downstream of the annular member.

It may be possible to provide a plurality of circumferentially arranged members which have radially inwardly and axially extending portions to retain the acoustic panels with resilient, spring, Z-shaped fingers rather than an annular member.

The resilient, spring, fingers may have other suitable shapes.

The present invention has been described with reference to an acoustic liner panel, but the present invention is equally applicable to a rotor blade liner panel. A rotor blade liner panel comprises a skin and a structure. The skin of each rotor blade liner panel comprises aluminium, titanium or composite material, for example fiber reinforced plastic e.g. glass fiber reinforced nylon. The structure comprises a honeycomb structure, for example an aluminium honeycomb, a titanium honeycomb, a composite material honeycomb, a resin impregnated paper honeycomb or other suitable honeycomb. The composite material honeycomb may comprise fiber reinforced plastic e.g. glass fiber reinforced nylon. The skin defines the flow path through the fan duct. The skin may have an abatable coating. The skin may be perforate to provide an acoustic treatment.

I claim:

1. A gas turbine engine casing comprising a generally cylindrical, or frustoconical, casing, the casing including at least one member secured to the casing, the member having a first portion extending radially from the casing and a second portion extending axially from the first portion of the member, at least one liner panel being positioned radially from the casing, a first end of the liner panel being removably securable on the member by at least one resilient spring finger, the at least one resilient spring finger being biased to move axially away from the first end of the liner panel to locate the at least one resilient spring finger on the second portion of the member wherein the at least one resilient spring finger being movably axially towards the center of the liner panel to remove the at least one resilient spring finger from the second portion of the member.

2. A gas turbine engine casing as claimed in claim 1 wherein a second end of the liner panel being removably securable on a further member by at least one further resilient spring finger, the at least one further resilient spring finger being biased to move axially away from the second end of the liner panel to locate on the further member, the at least one further resilient spring finger being movable axially towards the center of the liner panel to remove the at least one resilient spring finger from the further member.

3. A gas turbine engine casing as claimed in claim 2 wherein the member is an annular member.

4. A gas turbine engine casing as claimed in claim 2 wherein the member is a liner panel.

5. A gas turbine engine casing as claimed in claim 2 wherein the further member is a member secured to the casing having a first portion extending radially from the casing and a second portion extending axially from the first portion of the further member.

6. A gas turbine engine casing as claimed in claim 5 wherein the further member is an annular member.

7. A gas turbine engine casing as claimed in claim 5 wherein the further member is a liner panel.

8. A gas turbine engine casing as claimed in claim 1 wherein the resilient member extends the full length of the first end of the liner panel.

9. A gas turbine engine casing as claimed in claim 1 wherein there are a plurality of resilient members spaced apart on the first end of the liner panel.

10. A gas turbine engine casing as claimed in claim 2 wherein the at least one further resilient member extends the full length of the second end of the liner panel.

11. A gas turbine engine casing as claimed in claim 2 wherein there are a plurality of resilient members spaced apart on the second end of the liner panel.

12. A gas turbine engine casing as claimed in claim 1 wherein there are a plurality of liner panels arranged circumferentially within or around the casing, a first end of each liner panel being removably securable on the at least one member, the at least one member being annular, by at least one resilient member, the at least one resilient member of each liner panel being biased to move axially away from the first end of the liner panel to locate on the second portion of said annular member.

13. A gas turbine engine casing as claimed in claim 1 wherein the resilient member comprises a metal.

14. A gas turbine engine casing as claimed in claim 1 wherein the casing is arranged in operation coaxially around a rotor carrying a plurality of rotor blades, the casing having an upstream portion upstream of a plane containing the most upstream point of a leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade.

15. A gas turbine engine casing as claimed in claim 14 wherein the member is positioned axially upstream of the tip of the rotor blades, the member extending in a radially inwardly and axially downstream direction from a metal casing towards the tips of the rotor blades, the containment portion being downstream of the member, the containment portion of the casing having a greater diameter than the diameter of the casing at the member.

16. A gas turbine engine casing as claimed in claim 15 wherein the member is substantially in the plane containing the most upstream point of the leading edge of the rotor blades.

17. A gas turbine engine casing as claimed in claim 1 wherein the casing is a fan casing and the rotor blades are fan blades.

18. A gas turbine engine casing as claimed in claim 1 wherein the casing is a turbine casing and the rotor blades are turbine blades.

19. A gas turbine engine casing as claimed in claim 1 wherein the casing is formed from a metal.

20. A gas turbine engine casing as claimed in claim 19 wherein the casing is formed from titanium, an alloy of titanium, aluminium, an alloy of aluminium or steel.

21. A gas turbine engine casing as claimed in claim 1 wherein the liner panel is an acoustic liner panel.

22. A gas turbine engine casing as claimed in claim 21 wherein each acoustic liner panel comprises a perforated skin and a structure to form an acoustic treatment structure.

23. An acoustic liner panel comprising a perforate skin and a structure to form an acoustic treatment structure, a first end of the acoustic liner panel being removably securable on a member by at least one resilient member, the at least one resilient member being biased to move away from the first end of the acoustic liner panel to locate on the member.

24. An acoustic liner panel as claimed in claim 23 wherein a second end of the acoustic liner panel being removably securable on a further member by at least one further resilient member, the at least one further resilient member being biased to move away from the second end of the acoustic liner panel to locate on the further member.

25. A gas turbine engine liner panel comprising a first end of the acoustic liner panel being removably securable on a member by at least one resilient member, the at least one resilient member being biased to move away from the first end of the acoustic liner panel to locate on the member.

* * * * *